US007174851B2

(12) United States Patent
Bonner et al.

(10) Patent No.: US 7,174,851 B2
(45) Date of Patent: Feb. 13, 2007

(54) ANIMAL DISPLAY AND HABITAT ASSEMBLY

(75) Inventors: Ronald K. Bonner, Villa Park, CA (US); Eric R. Knudsen, Riverside, CA (US)

(73) Assignee: North America Pet Products, Corona, CA (US)

( * ) Notice: Subject to any disclaimer, the term of this patent is extended or adjusted under 35 U.S.C. 154(b) by 0 days.

(21) Appl. No.: 10/915,526

(22) Filed: Aug. 10, 2004

(65) Prior Publication Data
US 2006/0032453 A1    Feb. 16, 2006

(51) Int. Cl.
  A01K 1/03   (2006.01)
  E04B 7/08   (2006.01)
  A47F 3/00   (2006.01)

(52) U.S. Cl. .................. 119/452; 119/416; 119/455; 52/81.3; 52/36.1; 312/114; 312/138.1

(58) Field of Classification Search ........... 119/452, 119/250, 416–419, 428, 455–459, 474, 482, 119/245, 246; 52/81.1–81.3, 80.1, 36.1, 52/481.2, 238.1; D30/108; 312/114, 107, 312/138.1
See application file for complete search history.

(56) References Cited

U.S. PATENT DOCUMENTS

| | | | | |
|---|---|---|---|---|
| 11,830 A | * | 10/1854 | Granary | 52/745.01 |
| 625,105 A | * | 5/1899 | Hall | 312/114 |
| 1,837,625 A | * | 12/1931 | McKee et al. | 312/138.1 |
| 2,166,577 A | * | 7/1939 | Beckius | 52/169.1 |
| 2,499,478 A | * | 3/1950 | Feser | 52/81.3 |
| 3,237,599 A | * | 3/1966 | Torrey et al. | 119/419 |
| 3,584,927 A | * | 6/1971 | Ott et al. | 250/458.1 |
| 3,791,348 A | * | 2/1974 | Marnett | 119/482 |
| 4,085,705 A | | 4/1978 | Gland et al. | |
| 4,365,590 A | | 12/1982 | Ruggieri et al. | |
| RE31,556 E | * | 4/1984 | Buchanan | 119/436 |
| 4,448,150 A | * | 5/1984 | Catsimpoolas | 119/455 |
| 4,702,534 A | * | 10/1987 | Witt et al. | 312/114 |
| 5,042,425 A | | 8/1991 | Frost, Jr. | |
| 5,247,901 A | * | 9/1993 | Landon et al. | 119/419 |
| D366,976 S | * | 2/1996 | Bustos | D6/470 |
| D379,681 S | * | 6/1997 | Barman | D30/110 |
| 5,655,478 A | * | 8/1997 | Kiera | 119/165 |
| 5,702,166 A | * | 12/1997 | Lee | 312/107 |
| 5,954,013 A | | 9/1999 | Gabriel et al. | |
| 6,360,496 B1 | * | 3/2002 | Raccuglia | 52/169.1 |
| 6,457,437 B1 | | 10/2002 | Frasier et al. | |
| 2004/0144328 A1 | | 7/2004 | Bonner et al. | |
| 2005/0051108 A1 | * | 3/2005 | Syrigos et al. | 119/416 |

FOREIGN PATENT DOCUMENTS
DE    4214967 A1 * 11/1993

* cited by examiner

*Primary Examiner*—Andrea M. Valenti
(74) *Attorney, Agent, or Firm*—Advantage IP Law Firm

(57) ABSTRACT

An animal display and habitat assembly having a number of modular animal display units coupled together to enclose a common access area, each of the display units including an outwardly facing display frame with a viewing section between opposing upright members and laterally disposed transition members that include first sections coupled to the upright members and second sections projecting inwardly from their respective first sections to provide a pair of door jambs across which an access door may enclose a display compartment or may be opened into the common access area.

22 Claims, 6 Drawing Sheets

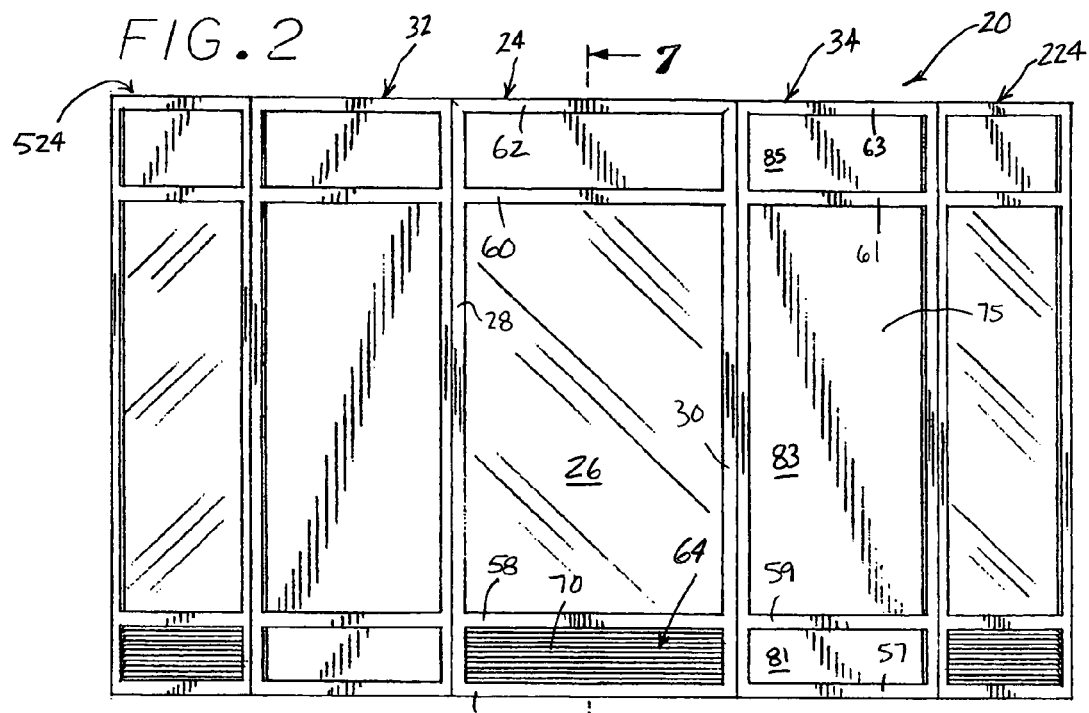
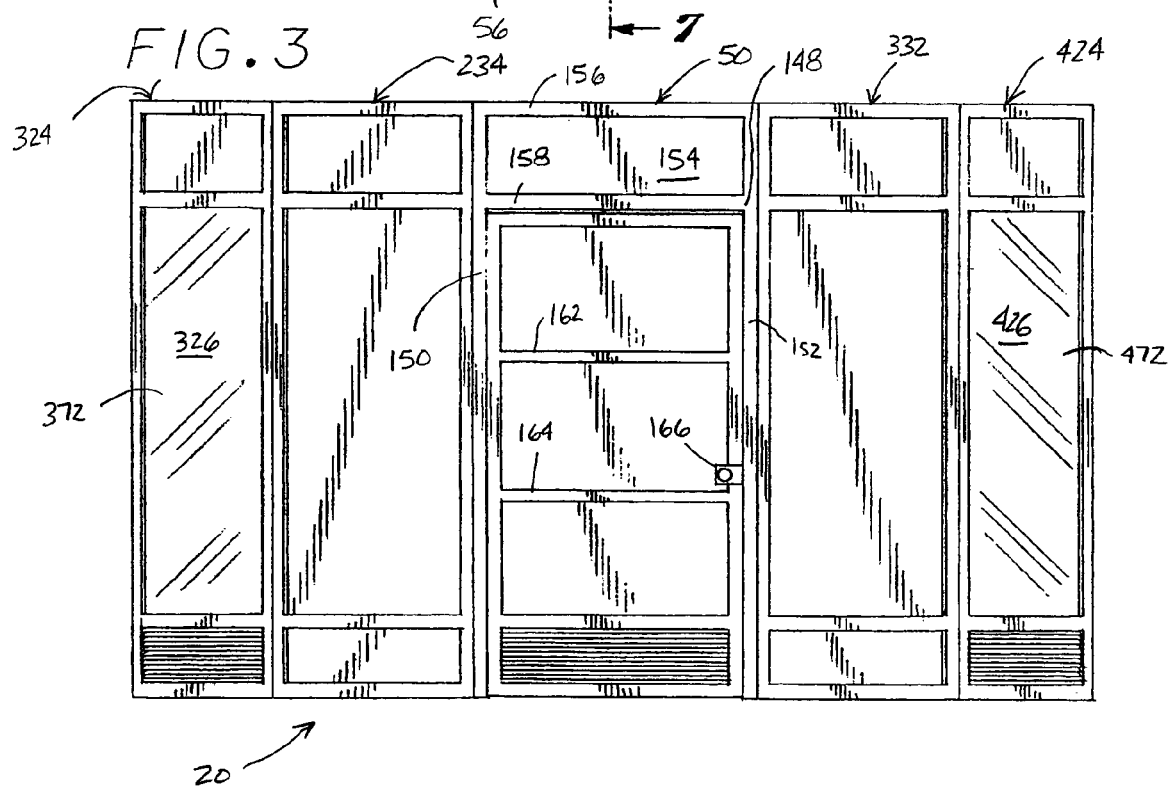

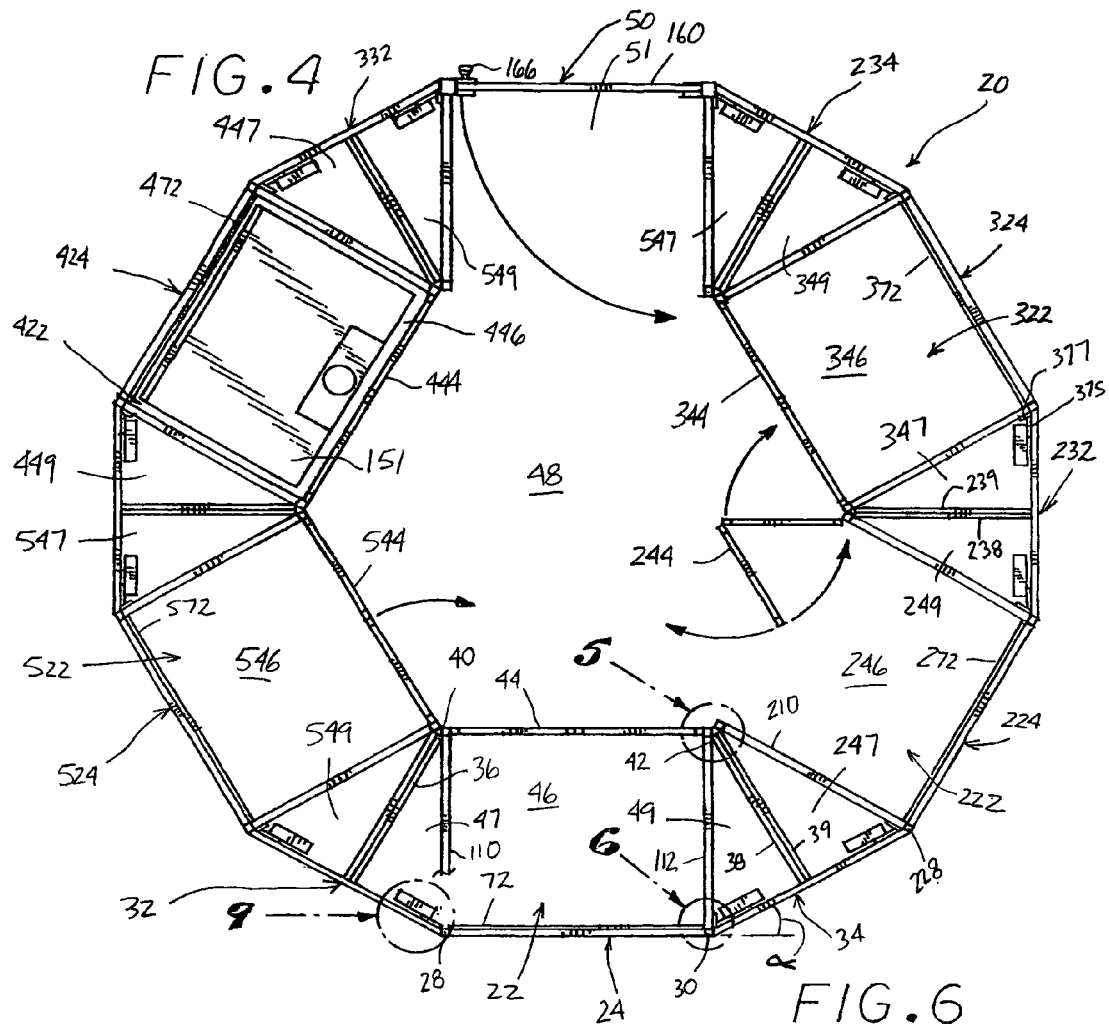
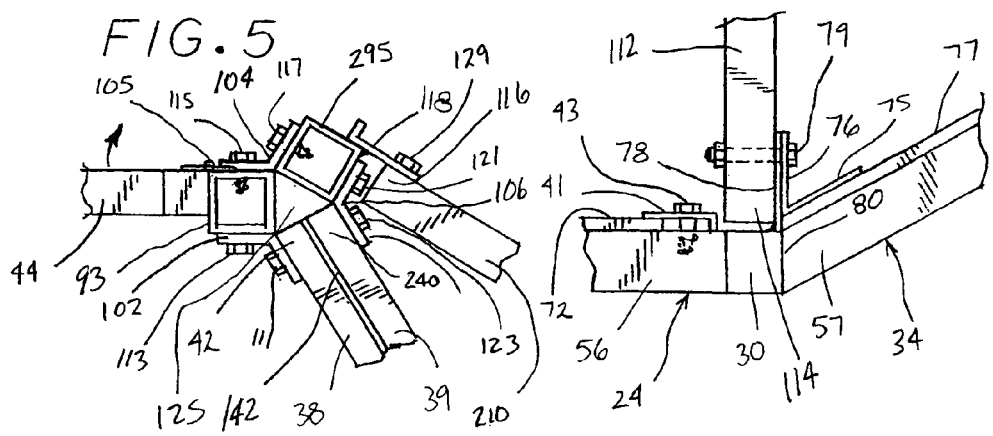

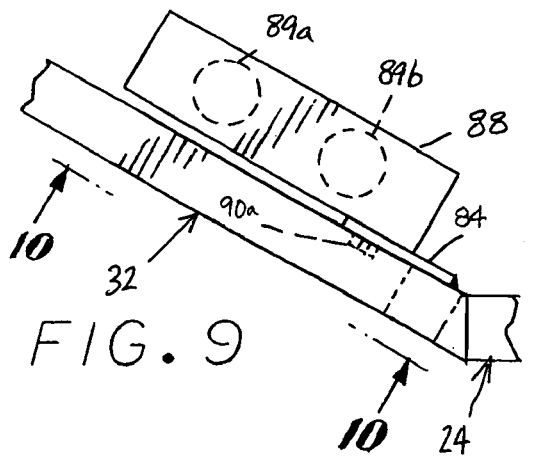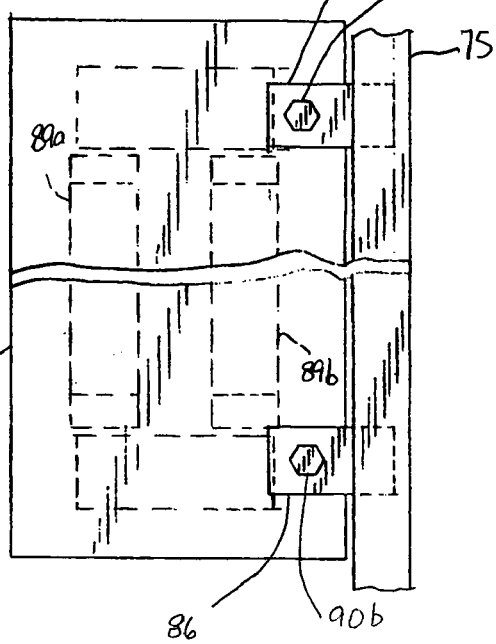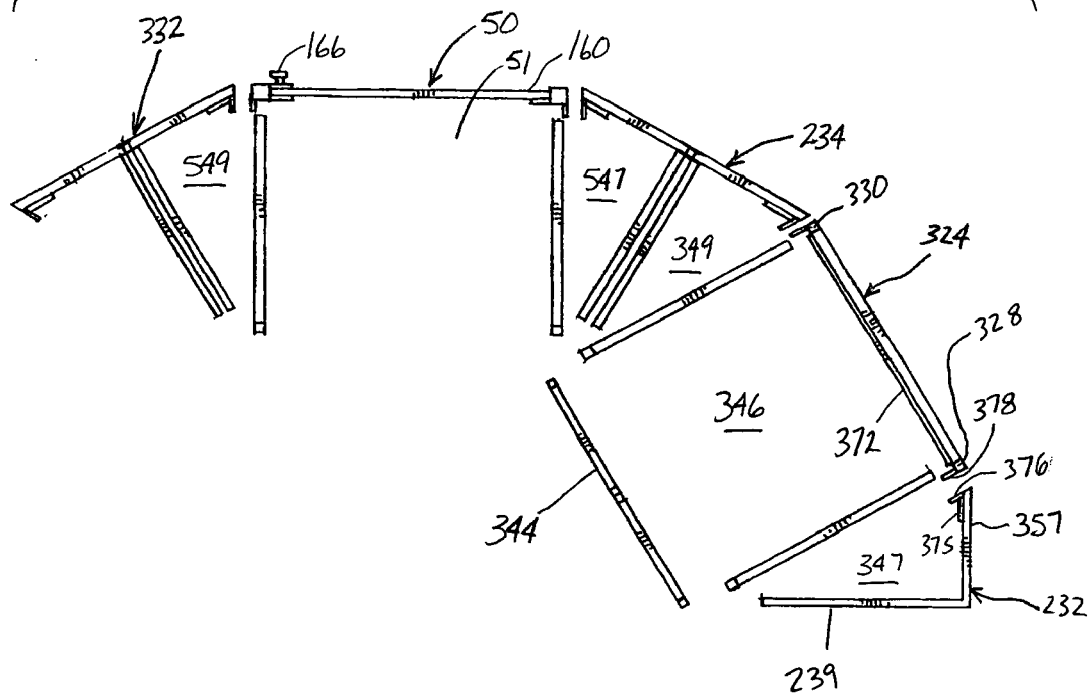

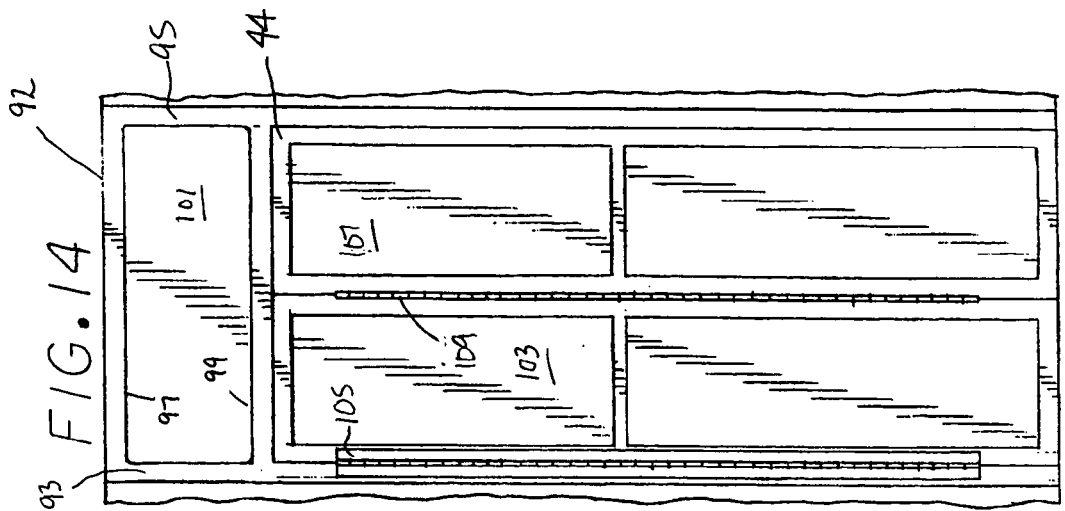
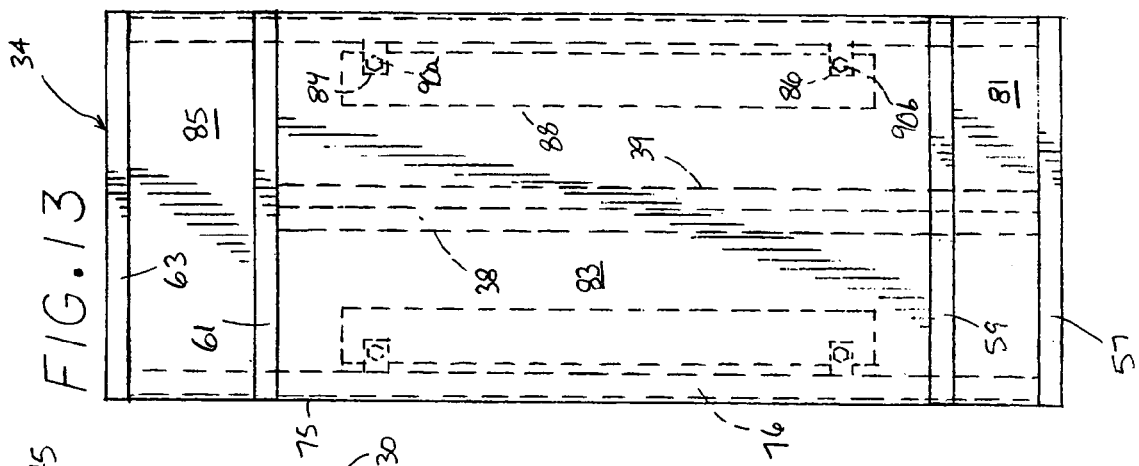
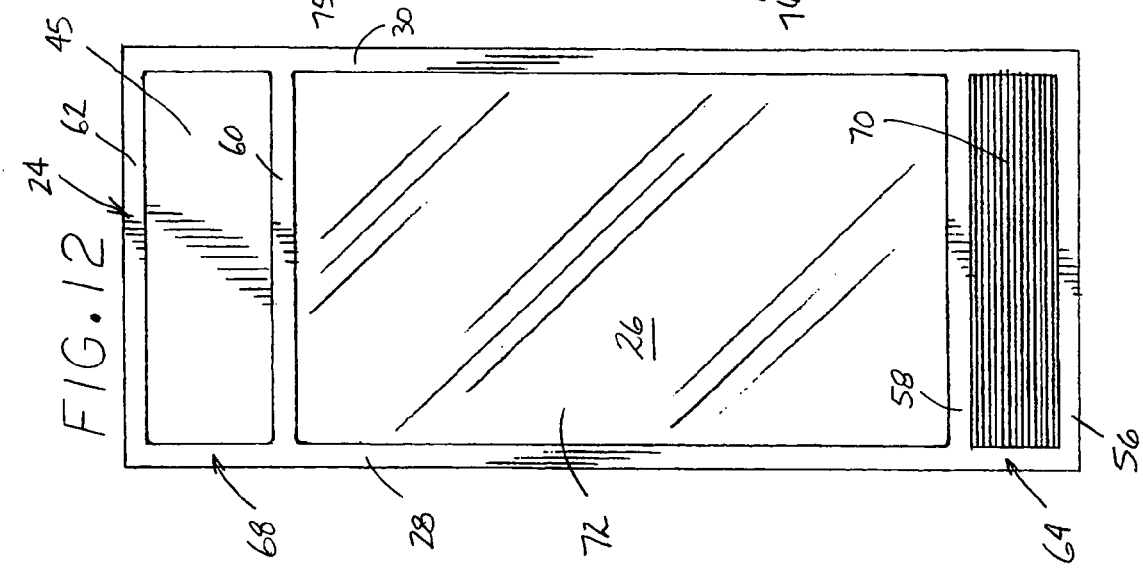

ANIMAL DISPLAY AND HABITAT ASSEMBLY

FIELD OF THE INVENTION

The present invention relates to the field of display devices, and more specifically, to display devices including a habitat for showcasing birds, reptiles, amphibians, small mammals, and other animals commonly sold in retail or specialty pet stores and providing environmental control of such habitat.

BACKGROUND OF THE INVENTION

In the pet wholesale and retail industries, maintaining the health of the animals such as birds, small mammals, fish, reptiles, and amphibians waiting to be sold is a paramount consideration. One such health maintenance concern involves reducing the impact of one sick animal from spreading to others nearby. Thus, in many instances, the animals requires isolation from one another, particularly wherein development of airborne contagions such as those common in birds may occur. Along these lines, it is often preferable to manage any cross contamination of the air in the various animal cages. Another health maintenance concern is providing a habitat that is comfortable for the animal. Some animals are preferably kept in groups while others prefer a more solitary habitat.

In addition to health maintenance, another significant consideration for the wholesaler or retailer is creating a display of the animals to entice sales. For example, enabling observation of the animals in a naturally simulated environment, providing information nearby about the animals being observed, and reducing odors emanating from the habitat produced by animal droppings or meals factor heavily in creating a display as well. Reducing allergens and animal dander produced by the animals is also a consideration. Another significant concern is the security of the animals and any structure housing the animals should take this into account. This is particularly important with exotic species of birds and reptiles with costs ranging anywhere up to tens of thousands of dollars. As a number of animals are typically maintained in one site or section of the store and their respective habitats may take up significant floor space, blending these health and marketing considerations into a satisfactory solution is often challenging.

A wide variety of animal display devices have been developed, although many sacrifice one or more of the foregoing considerations and emphasize others. For example, birds are often displayed in open air cages near heavy traffic locations in the store. Such cages may be unlocked or have a simple lock to prevent customers from opening the cage. However, the bird is exposed to the ambient air and allergens and dander are not controlled. In addition, the birds in these settings are often removed and stored in a more secure cage at the end of the shift thus further adding to the animal's discomfort.

Another common pet store set up involves dedicated built-in rooms for larger and more exotic birds that may have large a glass panel and an employee entrance in the back. These open air rooms typically do not reduce odors, airborne contaminants, or allergens produced by the animals and thus the customers and employees may suffer. In addition, typically the rooms are not well isolated and one sick animal may contaminate a number of animals in close contact, particularly in the situation where the air is shared. The environment surrounding the animals is also unpredictable and thus the animal's health may be a concern.

Reptiles, amphibians, and fish are often maintained in glass enclosures (tanks) that are stacked on shelving units. Each tank or series of tanks may have its own or common light source and common environmental control system. In addition, these tanks are typically exposed to the same ambient air. Also, these animals often have more significant environmental control concerns such as heating, air supply, and lighting and require more stable environment to improve the animal's chances of living a long and healthy life.

As for the marketing concerns, store inventory and internal appearance frequently change, and thus the built-in rooms offer little in the way of adaptability. In order to build a new habitat in another location of the store, additional rooms must be constructed and the old ones may have to be torn down. Also these rooms are typically located off to the side and away from the primary foot traffic and thus do not prominently display the animals.

For those displays that do locate animals in the heavily trafficked areas of the store, the presentation of the animals in a pleasing manner while providing security for the animals also presents a challenging solution as some animals are not particularly suited to lots of customer interaction and crowd access may present a problem. In addition, it is often desirable to locate the animals at an off site location such as at a trade show or other public appearance. In those cases, it would be advantageous to have a readily transportable assembly that somewhat resembles the habitat in the retail setting to reduce a change of environment impact on the animals.

Thus, what is needed and heretofore unavailable is an animal display and habitat structure satisfying a wide range of health and marketing concerns of the retail or wholesale pet owner while providing a secure environment for the animals and facilitating transportation of the display structure to alternate locations if desired.

SUMMARY OF THE INVENTION

In accordance with a preferred embodiment of the present invention, an animal display and habitat assembly is provided with a frame having a viewing section between a pair of opposing upright frame members and first and second transition members coupled to the upright frame members with each transition member including a section projecting inwardly and providing a door jamb with an access door spanning across two consecutive door jambs to cooperate with the frame and transition members to form a modular display unit with a display compartment and an outwardly facing viewing window and wherein at least two modular display units may be coupled together to form a common access area at a point interior to each access door.

In one aspect of the present invention, the animal display and habitat assembly includes transition members with a transverse base section with two opposing free ends and a divider section with one free end to form a wedge shaped transition member for coupling the opposing free ends to lateral sides of the consecutive frames and coupling the free end of the divider section with one side of an access door.

Another feature of the present invention incorporates a transition member with an angled flange for coupling to an anchor flange of a frame to dispose the transition member at a rearward angle from a plane passing through the frame.

Yet another feature of the present invention is the incorporation of a transition member having back to back L-shaped frames connected together to form a T-shaped transition member for coupling consecutive frames together.

In another aspect of the present invention, the frame includes a grill section set below a viewing section with the grill section extending outwardly beyond a plane passing through the viewing section for protection thereof.

Another facet of the present invention is the incorporation of modular display units that may be coupled together about a common access area closed off by a security door module.

One attribute of the present invention is the placement of advertising and information panels between consecutive display frames.

In yet another aspect of the present invention, the display compartments are isolated from one another and an environmental control system maintains a negative pressure environment in each compartment to draw ambient air through each compartment and into a ducting system to an exhaust outlet.

The display compartments are bordered to one side with a support compartment in which a light source may be mounted in another feature of the present invention.

Another facet of the present invention is the cooperation of multiple six-sided modular display units to form an outwardly faceted assembly with a polygonally shaped common access area.

Other aspects of the present invention will become apparent with further reference to the following drawings and specification.

BRIEF DESCRIPTION OF THE DRAWINGS

FIG. 2 is a front elevation view, in reduced scale, of the animal display and habitat assembly of FIG. 1;

FIG. 3 is a rear elevation view, in reduced scale, of the animal display and habitat assembly of FIG. 1;

FIG. 4 is a top plan view, in reduced scale, of the animal display and habitat assembly of FIG. 1 with the ceiling panels, environmental control sections, and internal access door frames removed;

FIG. 5 is a close up sectional view, in enlarged scale, of an assembly joint taken from oval 5 of FIG. 4;

FIG. 6 is a close up sectional view, in enlarged scale, of an assembly joint taken from oval 6 of FIG. 4;

FIG. 9 is a close up view, in enlarged scale, of a light source mounting assembly taken from oval 9 in FIG. 4;

FIG. 10 is a close up view, in enlarged scale, of the light source mounting assembly taken along lines 10—10 of FIG. 9;

FIG. 11 is a partial sectional exploded top plan view of the animal display and habitat assembly taken from FIG. 4;

FIG. 12 is a similar view as in FIG. 2 of the central frame, in enlarged scale;

FIG. 13 is a front elevational view of an exemplary transition member, in enlarged scale, of the animal display and habitat assembly of FIG. 2 with phantom lines illustrating the lighting mounting assembly;

FIG. 14 is a sectional rear elevational view of a compartment access door, in enlarged scale, of the animal display and habitat assembly of FIG. 1.

DETAILED DESCRIPTION OF THE PREFERRED EMBODIMENTS

Figure 1:
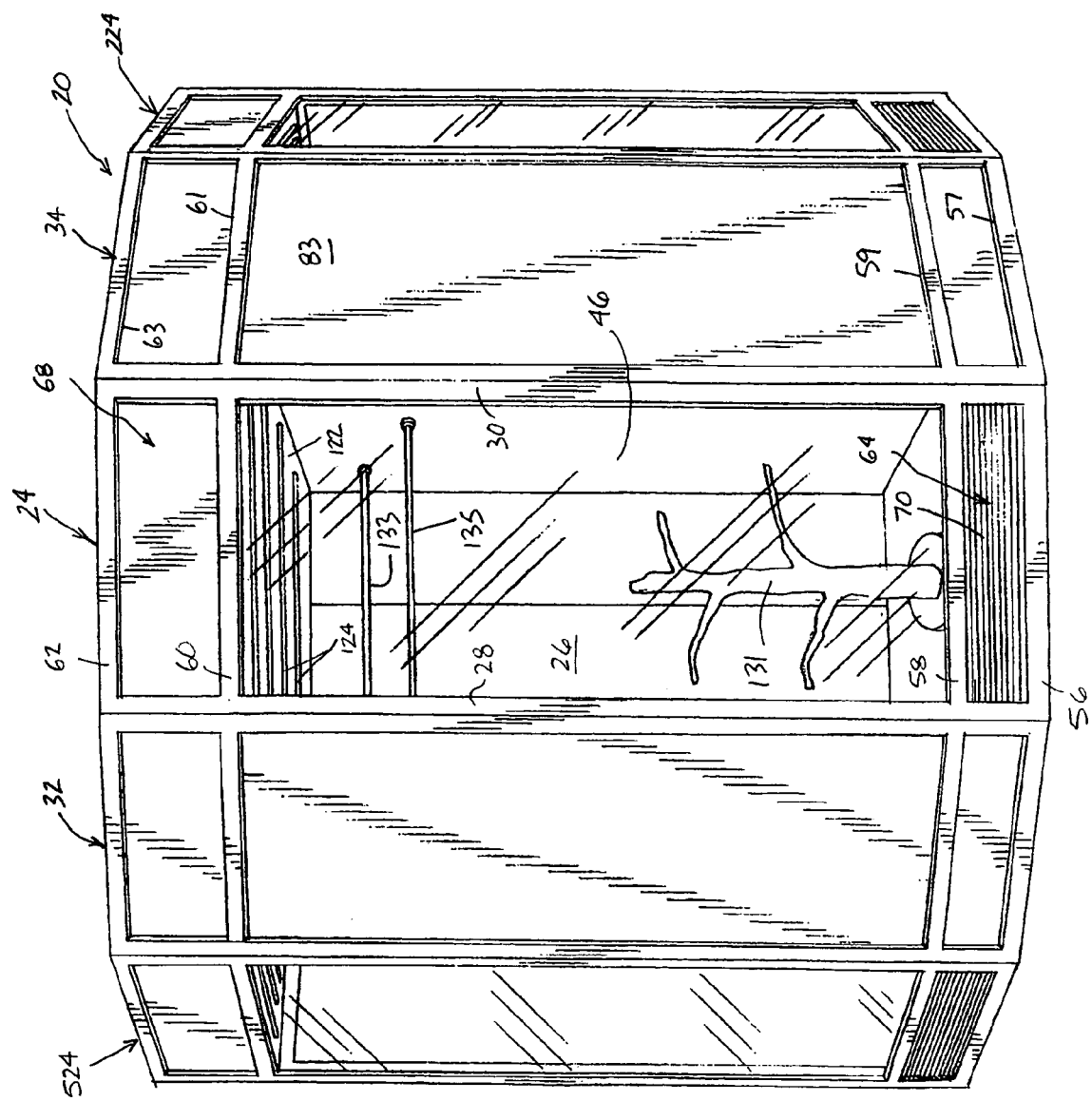
FIG. 1 is a forward perspective of an animal display and habitat assembly in accordance with a preferred embodiment of the invention.

Referring now to FIGS. 1, 2, and 4, an animal display and habitat assembly, generally designated 20, may provide a convenient housing for a number of animals such as birds, reptiles, amphibians, and small mammals for display in a retail or wholesale setting. The animal display and habitat system generally includes a number of modular animal display units, generally designated 22, each having an outwardly facing frame 24 with a transparent viewing section 26 positioned between a first upright frame member 28 and an opposing second upright frame member 30 that are connected to a corresponding first transition member 32 and a corresponding second transition member 34, respectively. The first and second transition members further include inwardly projecting sections 36 and 38, respectively, that provide opposing door jambs 40 and 42, respectively, across which an access door 44 coupled to one of the door jambs may span such that the frame, transition members, and access door cooperate to define an display compartment 46 through which animals may be viewed by the customers and which serves as the animal's habitat. A number of modular display units 22, 222, 322, 422, 522 may be connected together to form a common access area 48 interior to each of the access doors 44, 244, 344, 444, 544. Thus, from the common access area, an individual may access any one of the display compartments 46, 246, 346, 446, 546.

The animal display and habitat assembly 20 is generally a set of easy to assemble modular display units 22, 222, 322, 422, 522 that may provide a flexible display layout suitable for various allocations of available floor space. One such exemplary display as illustrated in FIGS. 1–4 includes five separate animal display modules 22, 222, 322, 422, 522 and a security door module 50 surrounding the central common access area 48. An exemplary display module 22 includes an animal display compartment 46 with a left support compartment 47 and a right support compartment 49, as viewed from above in FIG. 4 with the animal display compartment 46 centered. The support compartments may be formed by one half of the section laterally disposed transition members 32 and 34. While display module 22 is primarily described, other display modules 222, 322, 422, 522 may be constructed identically and throughout this description like components in other modules are numbered alike.

For example, moving counterclockwise around the animal display and habitat assembly illustrated in FIG. 4, display module 222 includes animal display compartment 246, left support compartment 247 and right support compartment 249. Likewise, display module 322 includes animal display compartment 346 and left support compartment 347 and right support compartment 349. Skipping over the security door module 50, display module 422 includes animal display compartment 446, left side support compartment 447, and right side support compartment 449. The fifth display module 522 includes animal display compartment 546, left side support compartment 547 and right side support compartment 549. The security module inserted in the display module ring between the third and fourth display module units 322 and 422, respectively includes a foyer 51 bordered by a left compartment 547 and a right side compartment 549 from transition member 234 and 332, respectively. The construction of the display module units will now be described in more detail using display module 22 as an example.

Referring now to FIGS. 2, 4 and 12, the display module 22 includes a rectangularly shaped display frame 24 as defined by a left upright 28 and a right upright 30 spaced apart by equal length transverse members including a bottom transverse member 56, a lower intermediate transverse member 58, an upper intermediate transverse member 60, and a top transverse member 62. These transverse members divide the outwardly facing surface of the display frame into three rectangular sections. A grill section 64 is positioned between the bottom transverse member 56 and the lower intermediate transverse member 58. The viewing section 26 is disposed between the lower intermediate transverse member 58 and the upper intermediate transverse member 60. This viewing section is the primary means through which customers can view the contents of an animal display compartment (habitat) 46.

An environmental control section 68 is positioned between and behind the upper immediate transverse member 60 and the top transverse member 62. Each of the uprights and transverse members are preferably constructed of rectangular tubular steel or steel alloy. However, other suitable metals such as aluminum, aluminum alloy or other materials such as plastic or wood may also be used. Preferably, these tubular members are cut at ninety degrees angles so that each upright member meets each transverse member at a right angle for ease of manufacture as well. The uprights and transverse members are preferably welded together but may be fastened using suitable conventional fasteners such as bolts if further breakdown of the frame is desired. The corners where respective transverse members meet with the uprights may also be rounded if desired.

The grill section 64 includes a vented grill 70 that provides a passage for ambient air to be drawn into the animal display compartment 46 under a negative pressure environment. The viewing section 26 includes a sheet 72 of sturdy, impact resistant, safety glass, plexiglass or other suitable transparent viewing material so that any animals inside the display compartment may be observed by the store employees and customers. In this exemplary display frame 24, the sheet 72 extends between the left and right uprights 28, 30 and the lower intermediate transverse member 58 and the upper transverse member 60. The sheet may be secured between a set of inwardly projecting flanges (not shown) built into the uprights or transverse members that the sheet may slidably fit into or, alternatively, clamped onto the uprights (FIG. 6) using a clamping flange 41 secured by a bolt 43 into the uprights or transverse members and is preferably recessed from the outermost surface of the uprights. Advantageously, the clear sheet provides a large viewing surface. Also, advantageously, the grill section 64 extends outwardly beyond a plane passing through the sheet to prevent shopping carts commonly used in retail settings from bumping the glass.

The environmental control section 68 incorporates a translucent or opaque plastic panel 45 to conceal any ducting used to draw air through the animal display compartment 46 through the grill 70 as will be described below in more detail. This section may also slant upwardly and inwardly from the face of the viewing section. Conveniently, anywhere a plastic panel is used throughout the display and habitat assembly 20, advertising or information about the animals in the nearby compartment or scenery may be incorporated.

With continued reference to FIGS. 1, 2, 4, and now FIG. 13, the left transition member 32 that separates adjacent display frames 24 and 524 and the right transition member 34 that separates adjacent display frames 24 and 224 are constructed identically for ease of manufacture. The right transition member 34 (as viewed in FIGS. 1, 2, and 4) will now be described. As viewed from the exterior of the assembly, the right transition member appears to be similarly constructed to the frame 24, that is, the right transition member includes a bottom transverse member 57, a lower intermediate transverse member 59, an upper intermediate transverse member 61, and an upper transverse member 63 dividing the transition member into a lower panel section 81, a middle panel section 83, and an upper panel section 85. The opposing free ends of the each of the transverse members 57, 59, 61, and 63 are beveled as will be explained in more detail below. Each of these three sections may includes a panel inserted between the respective transverse members that, like the panel 45 of the environmental control section 68 of the frame 24, may include advertising or other information displayed prominently thereon. While FIG. 1 displays a pair of uprights to either side of the transverse members of the transition member similar to the construction of the frame 24 and which would impart additional rigidity to the transition member, this is an optional construction and the preferred construction is illustrated in FIGS. 4 and 13 to reduce the overall amount of material required to construct the assembly.

Referring now to FIGS. 4 and 13, the transverse members 57, 59, 61, and 63 of the right transition member 34 are welded at right angles to an inwardly extending first divider leg 38 and a second inwardly extending divider leg 39. Other suitable connector means may be used. The divider legs are open frame-like structures extending toward the common access area. When viewed from above (FIG. 4), the right transition member includes a first L-shaped frame including one half of the transverse members 57, 59, 61, and 63 and the divider leg 38 connected back to back with a second L-shaped frame provided by the other half of the transverse members and the divider leg 39. A first section of each L-shaped frame is provided by the transverse members while a second section is provided by the respective divider leg. These two sections are welded at right angles to one another. In this exemplary construction, the transverse members connect both divider legs. However, it will also be appreciated that two separate L-shaped frames could be joined, welded, or otherwise coupled together to construct a transition member. In addition, a single generally L-shaped transition member having an outwardly facing base section (i.e. the transverse members) and a single divider leg may be used alone as a transition member for connecting multiple frames as opposed to the T-shaped transition member illustrated in FIG. 4.

Referring back to FIGS. 1 and 13, the transverse members 59 and 61 are spaced apart to form a rectangular open frame that may conveniently receive an outwardly facing advertising panel 75 that may be secured to the transverse members using clamping components as with the sheet 70 above or other suitable retainer. Preferably, the advertising panel 75 is relatively easy to remove as advertising frequently changes. This panel may also be used to provided printed information about the inhabitant of the adjacent compartment 46 or provide a motif for the assembly such as a forest, jungle, desert or aquatic scene. Likewise, advertising and information panels may be inserted between transverse members 57 and 59 or transverse members 61 and 63.

These panels may merely be used to conceal the construction of the assembly providing a more aesthetically pleasing appearance as well.

With reference to FIGS. 4 and 6, the connection between an exemplary transition member 34 and an adjacent frame 24 will now be described. The beveled free end 80 of transverse member 57 of transition member 34 for connecting to an adjacent frame upright 30 is cut at or formed with an angle and includes an inwardly projecting flange with a first flange leg 75 welded to the interior surface 77 of the transverse member 57 and a second flange leg 76 that is angled inwardly from the first flange leg so that it may lay flush up against an inwardly projecting upright anchor flange 78 of the upright member adjacent thereto when assembled (FIG. 6). The upright anchor flange projects inwardly at the height of the lower transverse member 56 to align with the second flange leg 76 of the angled flange of the transition member. A bolt 79 may is then be used to secure the anchor flange with the angled flange and thereby secure the transition member and frame together.

The free ends of the other transverse members 59, 61, and 63 are identical and aligned to butt up flush against the upright 30 opposite their respective corresponding transverse members 58, 60, and 62 of the frame 24 and align their respective angled flanges with the corresponding anchor flange aligned with each transverse member 58, 60, and 62 of the frame 24. Thus, for each frame and transition member connection, there are four sets of opposing anchor flanges and angled flanges that are bolted together. This is merely an exemplary number and more or less flanges may be used if desired. For example, as pictured in FIG. 13, the angled flange 76 projects from the top to the bottom of the transition member as opposed to being four discrete flanges. With such construction, the bolt holes of the angled flange are aligned with the corresponding anchor flanges of the frame 24. A similar single anchor flange may be used if desired.

An exploded view of like components for display module 322 and the alignment of the angled flange 376 projecting from the beveled free end of transverse member 357 with the upright anchor flange 378 projecting from upright 328 is shown in FIG. 11. The angled flange may either be an inwardly projecting extension from the end of the base section that is welded thereon or alternatively may in the form of an angled bracket as shown in FIGS. 6 and 11. The components of the transition members are preferably constructed of similar material to the frame 24.

Referring back to FIG. 4, the innermost end of the divider leg 38 provides a door jamb 42 disposed proximate a plane passing through the upright anchor flange 78. The L-shaped section of transition member 34 also forms a side support compartment 49 to the main compartment 46 into which equipment such as lighting equipment may be mounted. With reference to FIGS. 4, 9, 10 and 13, an exemplary lighting arrangement in left side compartment 47 is illustrated with upper mounting flange 84 and a lower mounting flange 86 projecting inwardly along the inner surface 75 of the angled flange at a convenient location. The angled flange has been removed from FIG. 9 to simplify the drawing. A light source 88 such as a fluorescent lamp assembly with a pair of fluorescent lamps 89a, 89b is secured using a pair of bolts 90a, 90b to the upper and lower mounting flanges and disposed to cast light into the compartment 46 and corresponding side support compartment 47. The light source may provide both a back lighting to the outwardly facing advertising panel 75 as well. A lighting assembly may be placed in each support compartment (49, 247, 249, 347, 349, 447, 449, 547, 549, 647, 649) if desired. Power for the lighting assembly may either be provided from a nearby electrical outlet or may be battery powered.

The opposing left upright member 28 is connected to the left transition member 32 in a like manner with the left and right transition members 32, 34 being mirror images of one another about the display frame 24 as viewed in FIG. 4. The inwardly extending divider leg 36 of the left transition member 32 terminates in an opposing door jamb 40.

Turning now to FIGS. 4 and 14, an access door 44 of the first display module 22 is illustrated as viewed from common access area 48. Surrounding three sides of the access door 44 is a door frame 92 include an upright left door support 93 and an upright right door support 95. An upper cross member 97 and lower cross member 99 join the door supports at right angles and provide a generally rectangular shaped door frame. A panel 101 may be inserted between the cross members to conceal the environmental control ducting or may be left open to provide passage for the ducting out of the upper section of the compartment as will be discussed below in more detail. The door supports and cross members are preferably constricted similarly to the frame uprights and transverse members.

With continued reference to FIG. 14, the access door 44 includes a first panel 103 coupled to the left support 93 with a piano hinge 105 and a second panel 107 coupled to the first panel with a second piano hinge 109. The right hand end of the access door as shown in FIG. 14 may merely abut the right door support 95 or the door may include a locking or latching mechanism at a convenient location to maintain the door in a closed position. The access door opens away from the compartment 46 and its two sections may be folded up against one another and against an adjacent access door such that the door frame is completely open. If desired, a conventional door seal (not shown) positioned between the margin of the folding access door and the door frame may be used to provide a better seal for the animal display compartment 46. Seals may also be used beneath each display frame and transition members to compensate for any imperfection between the lower edge of the display frame and transition members and the underlying support surface 141. A conventional seal may be used.

Turning now to FIGS. 4, 5, and 14, several assembly components converge and are joined together using suitable fasteners such as bolts although other suitable fasteners could be used. As shown in FIG. 5 illustrating a junction between the right transition member 34 and the right side of the access door 44 (as viewed in FIG. 4), the upright door support 93 of the door frame 92 is coupled to the right doorjamb 42 with an angled connector bracket 102 with one arm bolted 111 to a laterally facing side of the door jamb 42 and the other arm bolted 113 to a forwardly facing side of one end of the door support 93, that is, the side facing into the display compartment 46. The right door support 93 and an adjacent door support 295 of an adjacent access door 244 are also connected together using a similarly constructed angled door frame connector bracket 104 that includes one arm bolted 115 to the inwardly facing side of one door frame support 93 and the other arm bolted 117 to the inwardly facing side of one end of the adjacent door support 295. The adjacent door support 295 is then bolted to a doorjamb 240 on an adjacent transition section 39 with another angled connector bracket 106 using a similar pair of bolts 121, 123. This junction forms a triangular open space 125 between the ends of the adjacent doorjambs 42, 240 and the adjacent door support 93, 295. While only one set of angled brackets 102, 104, 106 are shown, preferably an upper set positioned about two-thirds of the height of the door frame and a lower set positioned about one-third of the height of the door frame are used. This multi-joint as illustrated in FIG. 5 is repeated around the assembly where two adjacent access doors meet the divider legs of a transition member. It will be appreciated that the door frames may be omitted if desired and the access doors may be coupled directly to the door jambs using conventional fasteners. Thus, the access door may be hingedly coupled to one of the door jambs directly.

For a display module such as exemplary display module 22, a set of components including the display frame 24, left and right transition members 32, 34 and access door 44 cooperate to, when assembled, define an animal display compartment 46 that generally includes a main rectangular animal habitat with two opposing triangularly shaped support compartments 47, 49 as provided by the left and right transition members. Optionally, the support compartments may be partitioned off from the animal habitat with a separator panel 110, 112. Referring to FIG. 6, an exemplary connection of the forward end 114 of a separator panel 112 is illustrated. The forward end 114 of the panel 112 may be secured to the inside of the display frame flange 78 using conventional fasteners (such as the bolt used to secured the angled flange to the frame flange) at the same time as the angled flange 76 is connected to the anchor flange 78. A longer bolt 79 may be used if necessary with this connection. Referring now to FIG. 5, an exemplary connection of an inner end 116 of a connector panel 210 is illustrated. The inner end 116 may be bolted 129 to an L-shaped bracket 118 that is also welded to a surface of the door frame support 295 (FIG. 5). The separator panels 110, 112 may be clear or translucent to diffuse the light from the light source 88 and effectively cooperate with the frame 24 and access door 44 to seal off the support compartments 47, 49 from the main animal habitat 46. With opposing separator panels in place, the animal habitat is walled off from the adjacent support compartments. As an alternative, an open frame constructed similarly to the display frame 24 could be connected between one end of the display frame and the corresponding side of the door frame leaving both side support compartments accessible from the main habitat 46. This habitat enclosure 46 may include accoutrements for the animals such as a perching tree 131 or an upper rear perch 133 or forward perch 135 as for example may be used for birds (FIG. 1). The underlying surface 141 of the display compartment 46 may be the flooring of the store or may be added as an insert such as a shallow tray to facilitate maintenance of the compartment.

Figure 7:
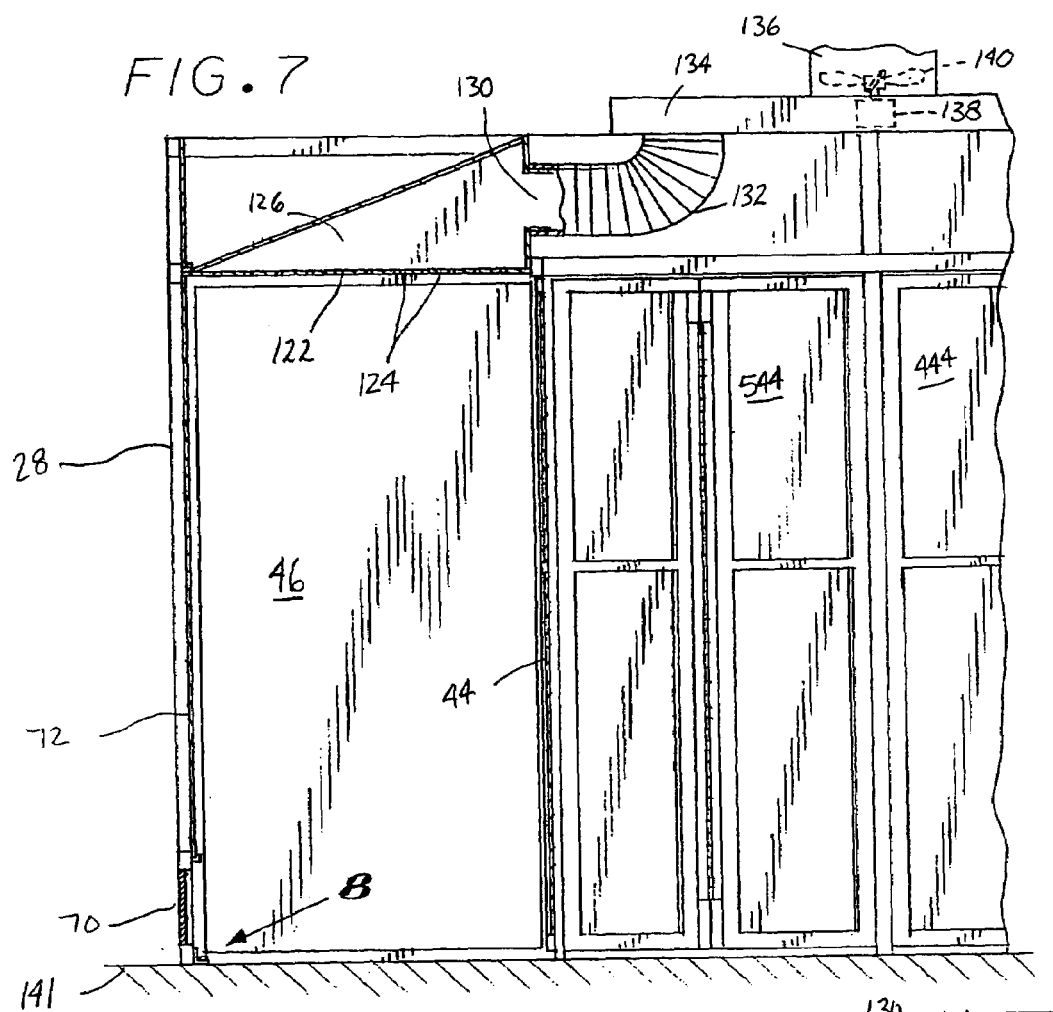
FIG. 7 is a sectional side view, in enlarged scale, taken along lines 7—7 of FIG. 2.
Figure 15:
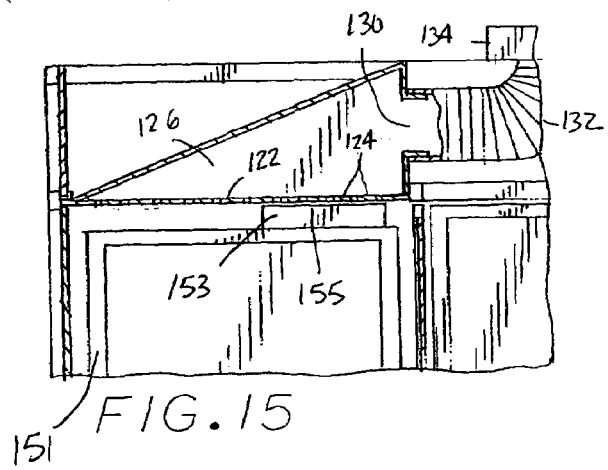
FIG. 15 is a close up sectional view illustrating the ducting system above a display compartment of the animal display and habitat assembly in conjunction with an alternative animal cage of FIG. 4.

With reference now to FIGS. 1, 7, and 15, above the top of the display compartment 46 is a ceiling 122 resting on the framework having a series of slots 124 for venting air from each compartment into a triangularly shaped collection duct 126 (FIG. 7) set above and supported by the ceiling that includes a rear outlet 130 coupled to a flexible ducting tube 132 that feeds into a collector 134 for all of the compartments 46, 246, 346, 446, 546. The collector leads to a main exhaust duct 136 that includes vacuum source 137 with a motor 138 and a fan 140. The main exhaust duct may be integrated into the building air control system such that air is vented externally to the building. Each compartment 46, 246, 346, 446, 546 preferably includes a collection duct in communication with the vacuum source 137.

The vacuum source 137 is constructed to create a slight negative pressure environment in the compartment 46. This will draw air through the grill 70 into the compartment, through the slotted ceiling 122 and into the exhaust duct 136. As each compartment 46, 246, 346, 446, and 546 is isolated from the other, cross contamination of the compartments does not occur. The air flow subsystem including the grill 70, slotted ceiling 122, collection duct 126, ducting tube 132, collector 134, exhaust duct 136 and vacuum source 137, and any seals used assists in keeping the animals healthy and isolated in case a contagion, particularly of the airborne variety, as is common in birds is developed. In addition, odors from droppings and foods, allergens, and dander are prevented from escaping to the customers on the outside of the compartment and is also kept away from the employees when working in the common access area. It is also contemplated to use filters in the grill 70 to filter incoming ambient air and at a position along the length the ducting to filter compartment air prior to its escape outside the building.

Referring to FIGS. 3 and 4, while the common access area may be entered by leaving a suitable gap between opposing open ended transition members, it is preferable to provide a security door module 146. The security door module includes an outwardly facing door frame 148 with left and right upright door supports 150, 152, respectively. The top section of the door frame is constructed identically to the top section of the display frame with a panel 154 between upper and lower transverse members 156, 158. A rectangular security door 160 with horizontal reinforcement bars 162, 164 is hingedly connected to one of the uprights. The other side of the door includes one part of a conventional locking component and door handle 166. The adjacent door frame upright includes the complementary locking component. For example, a cylinder lock openable with a key or a keypad may be used to secure the door. Thus, only employees with the key could enter the common access area. The exemplary security door is hinged on its left side as viewed in FIG. 3 and opens inwardly.

Referring back to FIG. 4, the display frame 24, left and right transition members 32, 34 and access door 44, and animal display compartment 46 form a modular animal display unit 22. A display assembly with multiple compartments or animal showcases may be formed by joining units together. Display module units 22 and 222 may be joined together by connecting a transition member 34, for example, between them. For example, the left hand end of the transition member 34 may be bolted to the right upright of 30 as described above. Then the right hand end of the transition member 34 may also be bolted to the left upright 228 of the next frame 224.

This assembly is continued until the desired number of compartments are established and different configurations may be established using more or fewer modules. The frames and transition members are arranged in an alternating relationship. The optional security module 50 is likewise coupled to transition members 234 and 332 and between display modules 322 and 422 to complete the outer ring assembly. In this exemplary embodiment, five separate display modules 22, 222, 322, 422, 522 and their respective compartments 46, 246, 346, 446, 546 and the security module 50 are provided in a twelve sided assembly. Then a ring of access doors 44, 244, 344, 444, and 544 are coupled to the interior door jambs as described above. The ring is open if the security door 160 is located on the exterior of the assembly as illustrated in FIG. 4. However, the security door 160 may alternatively be disposed in alignment with the ring of access doors and supported at the inner end of the security door module 50 so that the foyer 51 is open. A double set of security doors may also be used if desired. The outer frame and transition members are concentrically arranged around the ring of access doors with the divider legs providing the connection between the access door and outer framework.

Another optional feature is a partition 142 sandwiched between the back to back divider legs 38, 39 that effectively separates one support compartment 49 from an adjacent support 247 compartment. This partition may also be used to reflect light from the light assembly 88 back toward to the adjacent display compartment 46.

Figure 8:
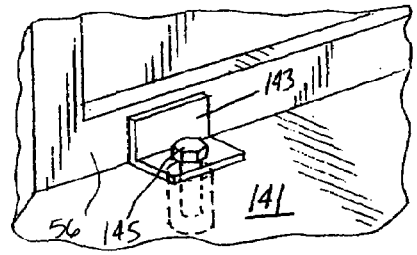
FIG. 8 is a close up view, in enlarged scale, taken along the direction of arrow 8 in FIG. 7.

Referring now to FIG. 8, while the weight of the typically metal structure is sufficient to inhibit the animal display and habitat assembly 20 from moving or being moved, in certain areas of the country prone to earthquakes and ground tremors, an optional L-shaped security bracket 143 may be welded to otherwise connected to the bottom inside edge of a bottom transverse member 56 on its upper leg and includes slot or aperture wherein a bolt 145 may be inserted and drilled into the underlying concrete 141 or support structure for added security.

When assembled, the access doors 44 face inwardly onto a common access area 48. In this exemplary embodiment, the common access area is approximately six feet across from one access door 344 to an opposing access door 544 but may be smaller or larger depending on the configuration selected by the assembler. By incorporating the folding access doors 44, the access area space is not obstructed when accessing a particular compartment. The common access area also provides sufficient space for an employee to work with the animal or remove the animal from the compartment to perform maintenance in the compartment. For example, the common access area could include an examination table, or grooming or nail clipping table.

It will be appreciated that the transition members may be constructed as an integral one-piece unit or be comprised of a number of section joined together to form the wedge shaped transition member. The exemplary construction discussed here is not meant to be limiting.

While the compartments 46 have generally been described in terms of a large animal habitat room, it will be appreciated that such compartment may be segmented off using partitions to display more animals. Such partitioned compartments may include a common ceiling or may be completely isolated from one another. In addition, a separate, preferably a conventional roll in unit 151 such as that shown in FIG. 4 in compartment 446 may be used. Such units typically include a series of shelves with tanks or cages placed thereon. The unit may includes its own ducting system 153 and exhaust outlet 155 that is abuts the ceiling panel 122 or, alternatively, is connected to the exhaust ducting above each compartment 46 using a suitable ducting component (FIG. 15). The ducting system may be easily removable such that the unit may be rolled into the common access area 48 through an access door 44 for maintenance and removal of the animals.

In this exemplary embodiment, the compartments are all like dimensioned and the outwardly facing display frame and transition members with back to back L-shaped members are equal in width thus resulting in a twelve-sided faceted assembly with five compartments and one security entrance module. This also provides a pleasing symmetrical appearance to the animal display assembly. However, it will be appreciated the dimensions may be varied from modular unit to modular unit. For example, the display frame may having varying widths as can the transition members. While the transition members are illustrated projecting rearwardly from a plane passing through an adjacent frame at an angle of approximately 25–45 degrees as indicated at angle alpha (FIG. 4) by varying the angles of the ends of the bases of the L-shaped frames and corresponding transition flanges 76, different animal display configurations may also be developed with smaller or larger common access areas. It is also contemplated the transition flange may be hingedly connected to the transverse members to facilitate even more radical designs.

The display frame and viewing sheet 70 have also generally been described as planar. However, it will also be appreciated that these sections could be bowed outwardly for instance to change the faceted appearance of the animal display system to one with a more rounded, contoured appearance. Similarly, the transition members may be curved structures as well and an alternative contoured to planar sectional assembly is also contemplated.

The construction of the animal display system lends itself to both small scale and large scale displays. For example, a typical display system for birds is 9–13 feet high and 10–12 feet wide from one display frame to an opposite display frame. However, these exemplary dimensions are merely for explanatory reasons and are not meant to be limiting in any manner.

It will further be appreciated that by removing a few bolts between sections, the overall animal display assembly may be quickly disassembled. A typical assembly time for a five compartment assembly as described herein takes about 3–4 hours for a bird display dimensioned as above using only three workers. Thus, the entire display lends itself to being transported to trade shows wherein temporary cages must be set up to more permanent fixtures in a retail setting. In addition, should the floor plan change in the store the animal display and habitat assembly system described herein may easily be moved to a suitable location.

While the present invention has been described herein in terms of a number of preferred embodiments for displaying animals or objects, various changes and improvements may also be made to the invention without departing from the scope and spirit thereof

We claim:

1. An animal display and habitat assembly comprising:
a ring of access doors surrounding a common access area;
a plurality of individual display panels, each display panel including a pair of opposing upright members and a window disposed therebetween for viewing through said display panel;
a plurality of individual transition panels, each transition panel including a connecting member having a first end and an opposing second end;
a framework defined by alternating individual of said display panels and individual said transition panels and removably coupling said panels together defining an outwardly facing faceted structure concentrically arranged about said ring of access doors; and
a plurality of divider panels, each said divider panel being connected at one end to an intermediate point of a selected transition panel and at an opposing end to one side of a selected access door with adjacent said access doors having at least one side coupled to a common divider panel with each said access door cooperating with a pair of transition panels and an opposing display panel to define a display compartment.

2. An animal display and habitat assembly comprising:
a frame defining a viewing section between a pair of opposing upright frame members;
a first transition member including a first section coupled to one of said upright frame members and a second section projecting inwardly from said first section and terminating in a first doorjamb;
a second transition member including a first section coupled to the other of said upright frame members and a second section projecting inwardly from said first section and terminating in a second doorjamb;

an access door coupled to one of said door jambs and, when in a closed position, projecting to the other of said door jambs to cooperate with said frame and said transition members to define a first modular display unit with a display compartment and an outwardly facing viewing section;

at least one other modular display unit coupled to said first modular display unit with said modular display units forming an inner perimeter of access doors defining and substantially enclosing a common access area with each said display compartment being directly accessible from said common access area through an access door corresponding to an individual said display compartment; and at least one transition member includes a T-shaped frame wherein the first section meets the second section at a right angle.

3. The animal display and habitat assembly as set forth in claim 2 wherein:

a set of five modular display units are coupled together leaving an open gap with a first free end and opposing second free end; and a security door module coupled to said free ends in said open gap to form a twelve-sided assembly and a six-sided common access area.

4. The animal display and habitat assembly as set forth in claim 2 wherein:

said viewing section includes a sheet of transparent material defining a plane; and said frame includes a lower grill section disposed below said viewing section with said grill section extending outwardly beyond said plane providing a bumper to protect said viewing section, said grill section further including vents operable to direct external air into said display compartment.

5. The animal display and habitat assembly as set forth in claim 2 wherein:

said frame of each modular display unit is between 9–13 feet in overall height and 30–48 inches in overall width with each frame separated from an adjacent frame by a transition member approximately 30–40 inches in width; and said common access area is between 5–7 feet across from one access door to an opposing access door.

6. The animal display and habitat assembly as set forth in claim 2 further including:

a door frame coupled to said door jambs with said access door including a first section hingedly attached to said door frame and a second section hingedly attached to said first section whereby said second section may be folded over onto said first section.

7. The animal display and habitat assembly as set forth in claim 2 further including:

a ceiling panel covering said display compartment of each display unit and including openings for passing compartment air there through.

8. The animal display and habitat assembly as set forth in claim 7 further including:

a collector duct disposed above said ceiling panel for receiving said compartment air passing through said openings; and a motorized fan operable to provide a negative pressure source in communication with said collector duct and operable to draw said compartment air out of each said display compartment and into said collector duct and prevent a cross flow of compartment air between said compartments.

9. The animal display and habitat assembly as set forth in claim 8 wherein:

said frame includes a vent for passing ambient air into said display compartment;

said collector duct is coupled to an exhaust duct; and said negative pressure source is operable to direct said ambient air through said display compartment to replace compartment air drawn into said exhaust duct.

10. The animal display and habitat assembly as set forth in claim 2 wherein:

said transition members project inwardly toward said common access area at an angle of approximately 25–45 degrees to a plane passing through said frame.

11. The animal display and habitat assembly as set forth in claim 2 wherein:

said frame is removably coupled to said transition members.

12. The animal display and habitat assembly as set forth in claim 2 further including:

a security door module connected to a free end of one of said modular display units and also coupled to a free end of another of said modular display units and cooperating with said modular display units to enclose said common access area.

13. The animal display and habitat assembly as set forth in claim 12 wherein:

said security door module includes a door frame having a first locking component and a door hingedly attached to a side of said door frame and including a complementary second locking component in alignment with said first locking component for preventing access to said common access area when said door is in a locked position.

14. The animal display and habitat assembly as set forth in claim 2 wherein:

said common access area is in the form of polygon when said modular display units are assembled.

15. The animal display and habitat assembly as set forth in claim 2 wherein:

said modular display unit is six-sided and includes said display compartment and two laterally disposed support compartments.

16. The animal display and habitat assembly as set forth in claim 2 wherein:

said upright frame members are linear; and said modular display units are uniform in size and shape.

17. An animal display and habitat assembly comprising:

a frame defining a viewing section between a pair of opposing upright frame members;

a first transition member including a first section coupled to one of said upright frame members and a second section projecting inwardly from said first section and terminating in a first doorjamb;

a second transition member including a first section coupled to the other of said upright frame members and a second section projecting inwardly from said first section and terminating in a second door jamb;

an access door coupled to one of said door jambs and, when in a closed position, projecting to the other of said door jambs to cooperate with said frame and said transition members to define a first modular display unit with a display compartment and an outwardly facing viewing section;

at least one other modular display unit coupled to said first modular display unit with said modular display units forming an inner perimeter of access doors defining and substantially enclosing a common access area with each said display compartment being directly accessible from said common access area through an access door corresponding to an individual said display compartment;

at least one anchor flange projecting inwardly toward said common access area from said frame;

at least one angled flange projecting inwardly from an end of said first section of one of said transition members toward said common access area and abutting said at least one anchor flange; and a fastener removably coupling said anchor flange to said angled flange and joining said one of said transition members with said frame.

18. An animal display and habitat assembly comprising:

a frame defining a viewing section between a pair of opposing upright frame members;

a first transition member including a first section coupled to one of said upright frame members and a second section projecting inwardly from said first section and terminating in a first doorjamb;

a second transition member including a first section coupled to the other of said upright frame members and a second section projecting inwardly from said first section and terminating in a second door jamb;

an access door coupled to one of said door jambs and, when in a closed position, projecting to the other of said door jambs to cooperate with said frame and said transition members to define a first modular display unit with a display compartment and an outwardly facing viewing section;

at least one other modular display unit coupled to said first modular display unit with said modular display units forming an inner perimeter of access doors defining and substantially enclosing a common access area with each said display compartment being directly accessible from said common access area through an access door corresponding to an individual said display compartment;

said frame of said first modular display unit includes a first upright member coupled to a left side transition member and a second upright member coupled to a right side transition member with each of said transition members defining a lateral side support compartment adjacent said display compartment; and said display compartment is four-sided and said lateral side support compartments are three-sided.

19. The animal display and habitat assembly as set forth in claim 18 further including:

a light source mounted in at least one side support compartment.

20. An animal display and habitat assembly comprising:

a frame defining a viewing section between a pair of opposing upright frame members;

a first transition member including a first section coupled to one of said upright frame members and a second section projecting inwardly from said first section and terminating in a first doorjamb;

a second transition member including a first section coupled to the other of said upright frame members and a second section projecting inwardly from said first section and terminating in a second door jamb;

an access door coupled to one of said door jambs and, when in a closed position, projecting to the other of said door jambs to cooperate with said frame and said transition members to define a first modular display unit with a display compartment and an outwardly facing viewing section;

at least one other modular display unit coupled to said first modular display unit with said modular display units forming an inner perimeter of access doors defining and substantially enclosing a common access area with each said display compartment being directly accessible from said common access area through an access door corresponding to an individual said display compartment; and least one said transition member includes a first L-shaped frame with a first divider leg and a second L-shaped frame with a second divider leg with respective said divider legs connected together back to back with a gap therebetween to form a T-shaped transition member.

21. The animal display and habitat assembly as set forth in claim 20 further including:

a partition inserted into said gap between said divider legs.

22. An animal display and habitat assembly comprising:

a frame defining a viewing section between a pair of opposing upright frame members;

a first transition member including a first section coupled to one of said upright frame members and a second section projecting inwardly from said first section and terminating in a first doorjamb;

a second transition member including a first section coupled to the other of said upright frame members and a second section projecting inwardly from said first section and terminating in a second door jamb;

an access door coupled to one of said door jambs and, when in a closed position, projecting to the other of said door jambs to cooperate with said frame and said transition members to define a first modular display unit with a display compartment and an outwardly facing viewing section;

at least one other modular display unit coupled to said first modular display unit with said modular display units forming an inner perimeter of access doors defining and substantially enclosing a common access area with each said display compartment being directly accessible from said common access area through an access door corresponding to an individual said display compartment; and at least one of said modular display units includes a first compartment panel connected between one of said upright frame members and said first doorjamb and a second compartment panel connected between the other of said upright frame members and said second doorjamb with said compartment panels, said access door, and said frame cooperating to define a rectangular display compartment.

* * * * *

UNITED STATES PATENT AND TRADEMARK OFFICE
CERTIFICATE OF CORRECTION

| | | |
|---|---|---|
| PATENT NO. | : 7,174,851 B2 | Page 1 of 1 |
| APPLICATION NO. | : 10/915526 | |
| DATED | : February 13, 2007 | |
| INVENTOR(S) | : Ronald K. Bonner and Eric R. Knudsen | |

It is certified that error appears in the above-identified patent and that said Letters Patent is hereby corrected as shown below:

On the Front Page, Item No. 73 (Assignee), please replace "America" with --American--.

At Column 16, Claim 20, line 18, please insert --at-- before the word "least".

Signed and Sealed this

Fifteenth Day of May, 2007

JON W. DUDAS
*Director of the United States Patent and Trademark Office*